(12) United States Patent
Wang et al.

(10) Patent No.: US 11,782,655 B2
(45) Date of Patent: Oct. 10, 2023

(54) METHOD AND APPARATUS FOR HANDLING IMAGE FORMING ABNORMALITY, IMAGE FORMING APPARATUS, AND STORAGE MEDIUM

(71) Applicant: Zhuhai Pantum Electronics Co., Ltd., Zhuhai (CN)

(72) Inventors: Yong Wang, Zhuhai (CN); Xuan Tan, Zhuhai (CN)

(73) Assignee: ZHUHAI PANTUM ELECTRONICS CO., LTD., Zhuhai (CN)

(*) Notice: Subject to any disclaimer, the term of this patent is extended or adjusted under 35 U.S.C. 154(b) by 0 days.

(21) Appl. No.: 17/478,111

(22) Filed: Sep. 17, 2021

(65) Prior Publication Data
US 2022/0091799 A1  Mar. 24, 2022

(30) Foreign Application Priority Data
Sep. 21, 2020 (CN) .......................... 202010993237.X

(51) Int. Cl.
G06F 3/12 (2006.01)
H04N 1/00 (2006.01)
G06K 15/02 (2006.01)

(52) U.S. Cl.
CPC .......... G06F 3/1229 (2013.01); G06F 3/1203 (2013.01); H04N 1/00039 (2013.01); H04N 1/00938 (2013.01)

(58) Field of Classification Search
None
See application file for complete search history.

(56) References Cited

U.S. PATENT DOCUMENTS

| | | | |
|---|---|---|---|
| 2003/0095279 A1* | 5/2003 | Kim ...................... | G06F 3/1284 358/1.14 |
| 2006/0098222 A1* | 5/2006 | Tachibana .......... | H04N 1/32662 358/1.14 |

(Continued)

FOREIGN PATENT DOCUMENTS

| | | |
|---|---|---|
| CN | 1641559 A | 7/2005 |
| CN | 1648850 A | 8/2005 |
| CN | 101860637 A | 10/2010 |

(Continued)

*Primary Examiner* — Beniyam Menberu
(74) *Attorney, Agent, or Firm* — ANOVA LAW GROUP, PLLC

(57) ABSTRACT

A method and an apparatus for handling image forming abnormality, and an image forming apparatus are provided. The method is applied to the image forming apparatus and includes acquiring a print job from a control terminal and analyzing the print job to obtain an analysis result. When the analysis result is a failed analysis, whether a control program installed on the control terminal is abnormal is determined accordingly. The control program is a program which enables the control terminal to exchange the print job with the image forming apparatus. If the control program installed on the control terminal is abnormal, an abnormal-driving information page is generated and printed to output. By printing to output the abnormal information page, the user can be effectively and clearly informed of the cause of the printer abnormality, which improves the efficiency and user experience of abnormality resolution.

20 Claims, 4 Drawing Sheets

(56) References Cited

U.S. PATENT DOCUMENTS

2010/0058123 A1\* 3/2010 Yamashirodani ... G06F 11/0733
714/48
2020/0097219 A1\* 3/2020 Nampo ................... G06F 3/121

FOREIGN PATENT DOCUMENTS

| | | | | | |
|---|---|---|---|---|---|
| CN | 102123223 | A | | 7/2011 | |
| CN | 104023156 | A | | 9/2014 | |
| CN | 104281421 | A | | 1/2015 | |
| JP | H0983765 | | \* | 3/1997 | ............ H04N 1/00 |
| JP | H113184 | A | | 1/1999 | |
| JP | H11110166 | | \* | 4/1999 | ............ G06F 3/12 |
| JP | 2000326568 | A | | 11/2000 | |
| JP | 2003029946 | A | | 1/2003 | |
| JP | 2003288180 | | \* | 10/2003 | ............ G06F 3/12 |
| JP | 2004268516 | | \* | 9/2004 | ............ G06F 3/12 |
| JP | 2006130816 | | \* | 5/2006 | ............ G06F 3/12 |
| JP | 2009056608 | | \* | 3/2009 | ............ G06F 3/12 |
| JP | 2010056752 | | \* | 3/2010 | ............ H04N 1/00 |

\* cited by examiner

METHOD AND APPARATUS FOR HANDLING IMAGE FORMING ABNORMALITY, IMAGE FORMING APPARATUS, AND STORAGE MEDIUM

CROSS-REFERENCE TO RELATED APPLICATION

This application claims priority to Chinese Patent Application No. 202010993237.X, filed on Sep. 21, 2020, the entire content of which is incorporated herein by reference.

TECHNICAL FIELD

The present disclosure generally relates to the field of image forming technology and, more particularly, relates to a method for handling image forming abnormality, an apparatus for handling image forming abnormality, an image forming apparatus, and a storage medium.

BACKGROUND

Before a user performs print operation using an image forming apparatus, such as a printer, a control program (e.g., the control program of the printer) may normally needs to be installed in a control terminal (also referred to as a driving terminal), such that print data issued by the user may be converted into a data format that the printer can recognize.

Different printers often use different analysis methods for analyzing print data, so that the control program of the printer may not match the firmware of the printer, which may result in the analysis failure and print failure. However, for miniature or small printers, or certain printers without large display screens, the user may not be prompted with the specific cause of the printer failure, which may have a poor user experience.

SUMMARY

A method for handling image forming abnormality, an apparatus for handling image forming abnormality, an image forming apparatus, and a storage medium are provided in embodiments of the present disclosure. When an abnormality occurs in the control program of the image forming apparatus, the abnormality is outputted through printing to remind the user of the specific cause of the abnormality, which improves the abnormality handling efficiency and the user experience.

The first aspect of the present disclosure provides a method for handling image forming abnormality is applied to an image forming apparatus. The method includes: acquiring a print job from a control terminal; analyzing the print job to obtain an analysis result; when the analysis result is a failed analysis, determining whether a control program installed on the control terminal is abnormal according to the analysis result, where the control program is a program which enables the control terminal to exchange the print job with the image forming apparatus; and if the control program installed on the control terminal is abnormal, generating an abnormal-driving information page, and printing to output the abnormal-driving information page.

Optionally, the analysis result includes a version number and/or a compression parameter of the control program.

Optionally, when the analysis result includes the version number of the control program, determining whether the control program installed on the control terminal is abnormal according to the analysis result includes: acquiring a preset version of the control program that is pre-stored; and when the version number of the control program in the analysis result is inconsistent with the preset version, determining that the control program is abnormal.

Optionally, when the analysis result includes the compression parameter, determining whether the control program installed on the control terminal is abnormal according to the analysis result includes: acquiring a decompression parameter pre-stored by an analysis unit of the image forming apparatus; and when the decompression parameter does not correspond to the compression parameter, determining that the control program is abnormal.

Optionally, the abnormal-driving information page includes a preset network address for driving, such that the control program is maintained according to the preset network address for driving.

Optionally, the method further includes: transmitting the print job from the control terminal to the image forming apparatus through the control program and generating the abnormal-driving information page; and transmitting the abnormal-driving information page to the control terminal.

Optionally, the method further includes when the control program is abnormal, using an abnormality handling module to analyze the print job and print to output the abnormal-driving information page. When the print job is a print job issued for a first time by the control program of the control terminal and if the control program is abnormal, the abnormal-driving information page is generated and outputted. When the print job is not a print job issued for the first time by the control program of the control terminal or when continuous execution is confirmed by a user, the abnormality handling module is used to analyze the print job, and the abnormal-driving information page is outputted through printing.

The second aspect of the present disclosure provides an apparatus for handling image forming abnormality. The apparatus includes: a print job acquisition module, configured to acquire a print job from a control terminal; an analysis module, configured to analyze the print job to obtain an analysis result; an abnormality determination module, configured to, when the analysis result is a failed analysis, determine whether a control program installed on the control terminal is abnormal according to the analysis result, where the control program is a program which enables the control terminal to exchange the print job with the image forming apparatus; and an information page printing module, configured to, if the control program installed on the control terminal is abnormal, generate an abnormal-driving information page, and print to output the abnormal-driving information page.

Optionally, the print job includes job header information, page information, page compression parameter, page compression data, and job tail information.

Optionally, the analysis result includes a version number and/or a compression parameter of the control program.

Optionally, if the analysis result includes the version number of the control program, the abnormality determination module includes: a preset version acquisition unit, configured to, when the analysis result is a failed analysis, acquire a preset version of the control program that is pre-stored; and a first abnormality determination unit, configured to, when the version number of the control program in the analysis result is inconsistent with the preset version, determine that the control program is abnormal.

Optionally, if the analysis result includes a compression parameter of the control program, the abnormality determination module is configured to: acquire a decompression parameter pre-stored by the analysis module; and when the analysis result is a failed analysis and the decompression parameter does not correspond to the compression parameter, determine that the control program is abnormal.

Optionally, the abnormal-driving information page includes a preset network address for driving, such that the control program is maintained according to the preset network address for driving.

Optionally, the print job is transmitted from the control terminal to the handling apparatus through the control program, and the handling apparatus further includes: an information page transmission module, configured to, after the abnormal-driving information page is generated, transmit the abnormal-driving information page to the control terminal.

Optionally, the handling apparatus further includes an abnormality handling module, where the abnormality handling module is configured to, when the control program is abnormal, analyze the print job and print to output the abnormal-driving information page. When the print job is a print job issued for a first time by the control program of the control terminal and if the control program is abnormal, the abnormal-driving information page is generated and outputted. When the print job is not a print job issued for the first time by the control program of the control terminal or when continuous execution is confirmed by a user, the abnormality handling module is used to analyze the print job, and the abnormal-driving information page is outputted through printing.

The third aspect of the present disclosure provides an image forming apparatus. The image forming apparatus includes a memory and at least one processor, where the memory stores computer-executable instructions; and the at least one processor executes the computer-executable instructions stored in the memory, such that the at least one processor executes the method for handling image forming abnormality according to any embodiments of the present disclosure.

The fourth aspect of the present disclosure provides a computer-readable storage medium. Computer-executable instructions are stored in the computer-readable storage medium, and when a processor executes the computer-executable instructions, the method for handling image forming abnormality according to any embodiments of the present disclosure is implemented.

Other aspects of the present disclosure can be understood by those skilled in the art in light of the description, the claims, and the drawings of the present disclosure.

Various embodiments of the present disclosure provide the method for handling image forming abnormality, the apparatus for handling image forming abnormality, the image forming apparatus, and the storage medium. The method is applied to the image forming apparatus. For the print job transmitted from the control terminal, the print job is analyzed through the analysis unit, and whether the control program is abnormal is determined according to the analysis result; and if the control program is abnormal, the corresponding abnormal-driving information page is automatically printed out. Therefore, the user may clearly know the cause of the print failure according to the abnormal-driving information page printed out; furthermore, the control program may be maintained, the abnormality handling efficiency may be improved, and the user experience may be improved.

BRIEF DESCRIPTION OF THE DRAWINGS

The drawings herein are incorporated into the specification and constitute a part of the specification, show various embodiments that conform to the present disclosure, and are used together with the specification to explain the principle of the disclosure.

Through the above-mentioned drawings, the specific embodiments of the present disclosure have been shown, which are described in more detail hereinafter. These drawings and descriptions are not intended to limit the scope of the concept of the present disclosure in any way, but to explain the concept of the present disclosure for those skilled in the art by referring to specific embodiments.

DETAILED DESCRIPTION

Exemplary embodiments are described in detail herein, and examples thereof are shown in the accompanying drawings. When the following description relates to the drawings, unless otherwise indicated, same numbers in different drawings indicate same or similar elements. The implementation manners described in the following exemplary embodiments do not represent all implementation manners consistent with the present disclosure; instead, they are merely examples of apparatuses and methods consistent with some aspects of the present disclosure as detailed in the appended claims.

The technical solutions of the present disclosure and how the technical solutions of the present disclosure solve the above-mentioned technical problems are described in detail below with specific embodiments. The following specific embodiments may be combined with each other, and same or similar concepts or processes may not be repeated in some embodiments. Embodiments of the present disclosure are described below in conjunction with the accompanying drawings.

The application scenarios of exemplary embodiments of the present disclosure are described hereinafter.

Figure 1:
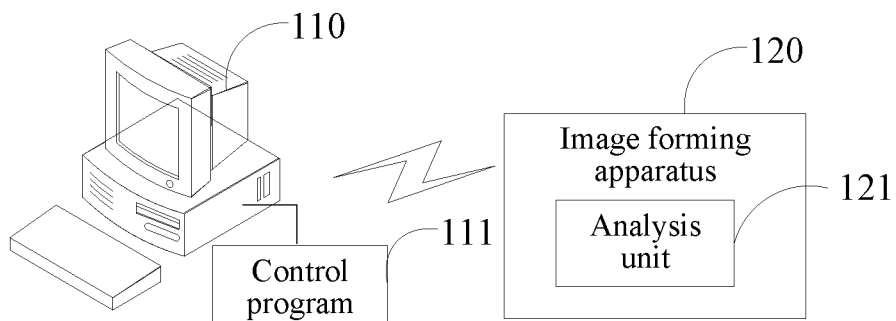
FIG. 1 illustrates a schematic of an application scenario of a method for handling image forming abnormality according to various exemplary embodiments of the present disclosure.

FIG. 1 illustrates a schematic of an application scenario of a method for handling image forming abnormality according to various exemplary embodiments of the present disclosure. As shown in FIG. 1, a user may send a print instruction of a print job to an image forming apparatus 120 through a control terminal 110 (e.g., a computer); a control program 111 in the control terminal 110 may receive the print job, convert the print job into a printer recognizable data format (e.g., postscript page description language (PDL)) and compress the print job; after the image forming apparatus 120 receives the print job compressed by the control program 111, an analysis unit 121 of the image forming apparatus 120 may analyze the print job to obtain corresponding print content and print parameter, thereby implementing the print output of the print content. When the control program 111 does not match the analysis unit 121 of the image forming apparatus 120, the analysis unit 121 may not be able to perform correct analysis of the print job, and the image forming apparatus 120 may print out garbled characters. Existing miniature printers or certain printers with low cost, due to the limited sizes of the display screens, only limited text may often be used to describe the abnormality on one side of the image forming apparatus 120, such as indicating the abnormality by an error code. Since the user is not familiar with the error code of the printer, the user may need to consult the user manual or use the Internet to know the specific cause of the abnormality, which may have poor convenience.

In order to solve the above-mentioned problems, the main concept of the technical solutions of various embodiments of the present disclosure is the following. When it is determined that the control program is abnormal according to the analysis result of the print job, an abnormal-driving information page may be generated, and the abnormal-driving information page may be outputted through printing, such that the user may know the specific cause of the printer abnormality according to the content of the abnormal-driving information page. Therefore, it is convenient for the user to maintain the control program according to the content recorded on the information page, thereby improving abnormality handling efficiency and user experience.

Figure 2:
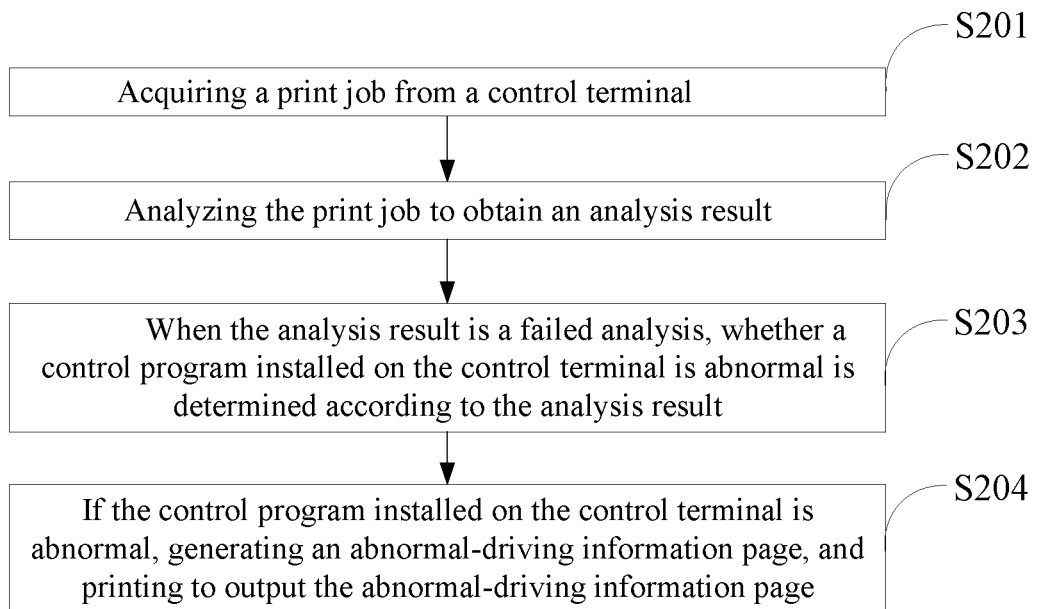
FIG. 2 illustrates a flowchart of a method for handling image forming abnormality according to various exemplary embodiments of the present disclosure.

FIG. 2 illustrates a flowchart of a method for handling image forming abnormality according to various exemplary embodiments of the present disclosure. The method for handling image forming abnormality may be applied to an image forming apparatus, such as a miniature printer. As shown in FIG. 2, the method for handling image forming abnormality provided in one embodiment may include following steps.

In S201, the print job from the control terminal may be acquired.

The control terminal may also be referred to as a driving terminal or a user terminal, on which a control program may be installed, such that the control terminal may exchange the print job with the image forming apparatus through the control program. The specific form of the control terminal may be a computer device. The control program may be a driving program. The print job may be a print job generated by the control program according to the print instruction inputted by the user. The control program may be an application program. When the control terminal is a mobile device such as a mobile phone, the mobile phone may issue the print job to the image forming apparatus through the application program. The control program in one embodiment of the present disclosure may be a program which enables the control terminal to exchange the print job with the image forming apparatus.

Specifically, the content to-be-printed of the control terminal may be acquired based on the control program; and after receiving the print instruction, the print job may be generated according to the print instruction and the content to-be-printed.

Furthermore, the print job may include job header information, page information, a page compression parameter, page compression data, and job tail information. The job header information may include information such as a number of pages of the print job, a paper type, a version number of the control program, and the like; the page information may be the information of a current print page, including a page number, margins, a print parameter, and the like of the current page; the page compression parameter may include information such as the compression parameter, compression manner, and the like corresponding to the control program; the page compression data may include the compressed page content of each current page according to the page compression parameter; and the job tail information may include identification information related to the end of job printing.

In S202, the print job may be analyzed to obtain an analysis result.

The analysis result may include the version number and/or compression parameter of the control program. The print job may include the job header information, the page information, the page compression parameter, the page compression data, and the job tail information. The compression parameter may include a page compression parameter in the print job, and the compression parameter may also include a compression manner.

Specifically, when the analysis is successful, the analysis result may also include the print parameter and the print content corresponding to the print job.

Specifically, the image forming apparatus may acquire the print job which may be analyzed through the analysis unit of the image forming apparatus; the analysis unit may acquire relevant print parameter and page compression parameter from the page information; and when the analysis is successful, the analysis result may include the print parameter and specific print content corresponding to the print job. Therefore, the image forming apparatus may print the print job and output the print result according to the print parameter and the print content.

When the analysis unit cannot successfully analyze the print job, that is, when the analysis unit does not match the control program, the analysis result may not include corresponding print parameter and print content. The analysis result may include the version number of the control program, the compression parameter, and the like, and may also include the specific cause for the analysis failure. The analysis unit of the present disclosure may be, for example, a hardware module, such as a unit capable of analyzing the print job in an system-on-chip (SOC) of the image forming apparatus, and may also be, for example, a software module, such as an instruction code segment that executes firmware code running in the image forming apparatus.

Specifically, as user's requirements become higher, merchants may upgrade the firmware of existing image forming apparatuses. For example, the analysis unit may improve analysis efficiency after the firmware is upgraded, which may result in that its corresponding control program also needs to be upgraded or replaced accordingly. When the user uses the old version of the control program to generate a print job and send the print job to the image forming apparatus, the analysis unit of the image forming apparatus cannot analyze the print job of such version of the control program, which may result in that the image forming device outputs garbled characters to cause printing failure.

In S203, when the analysis result is a failed analysis, whether the control program installed on the control terminal is abnormal may be determined according to the analysis result.

The control program may be a program which enables the control terminal to exchange the print job with the image forming apparatus.

Specifically, whether the control program is abnormal may be determined according to the version number and/or compression parameter of the control program in the analysis result.

Furthermore, whether the analysis is failed due to the control program may be determined according to the particular cause for the analysis failure recorded in the analysis result.

In S204, if the control program installed on the control terminal is abnormal, the abnormal-driving information page may be generated, and the abnormal-driving information page may be outputted through printing.

The abnormal-driving information page may be generated according to the analysis result. The abnormal-driving information page may record the specific cause for the analysis failure, the method to solve the problem, and the contact information or address of the relevant personnel, and the like.

Specifically, when the control program is abnormal, the analysis result may include a control program abnormality signal; the image forming apparatus may acquire an abnormal-driving information standard page (which is different than an abnormal-driving information page) from its preset storage location according to the control program abnormality signal, the abnormal-driving information page may be generated according to the control program abnormality signal and the abnormal-driving information standard page, and the abnormal-driving information page may be outputted through printing by the printing mechanism of the image forming apparatus.

The abnormal-driving information page may include a download address of the control program corresponding to the image forming apparatus.

Exemplarily, the content recorded in the abnormal-driving information page may include "the version of the control program is inconsistent with the version of the printer firmware, and please download the control program from the following network address: network address A".

Specifically, the abnormal-driving information page may include a download address of the correct control program corresponding to the analysis unit of the image forming apparatus or an official website address of the manufacturer of the image forming apparatus.

Optionally, the abnormal-driving information page may further include a preset network address for driving of the image forming apparatus, such that the control program of the image forming apparatus may be maintained according to the preset network address for driving.

The preset network address for driving may be a download address of the control program supported by the analysis unit of the image forming apparatus.

Specifically, the user may download the corresponding control program according to the preset network address for driving to update the control program of the control terminal.

Various embodiments of the present disclosure provide the method for handling image forming abnormality. For the print job transmitted from the control terminal, the print job may be analyzed through the analysis unit, and whether the control program is abnormal may be determined according to the analysis result; and if the control program is abnormal, the corresponding abnormal-driving information page may be automatically printed out. Therefore, the user may clearly know the cause of the print failure according to the abnormal-driving information page printed out; furthermore, the control program may be maintained, the abnormality handling efficiency may be improved, and the user experience may be improved.

Figure 3:
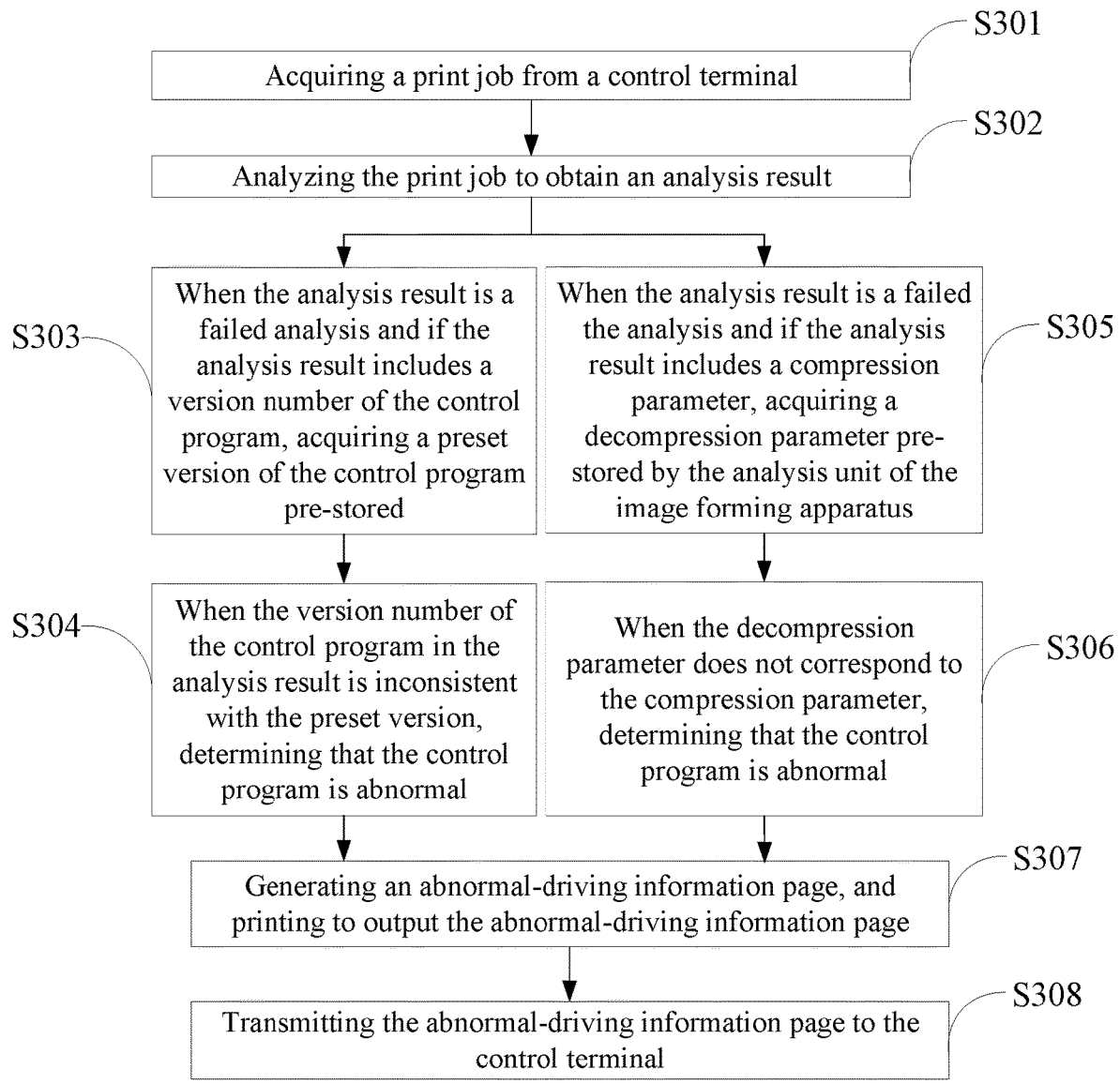
FIG. 3 illustrates another flowchart of a method for handling image forming abnormality according to various exemplary embodiments of the present disclosure.

FIG. 3 illustrates another flowchart of a method for handling image forming abnormality according to various exemplary embodiments of the present disclosure. As shown in FIG. 3, the method for handling image forming abnormality provided in one embodiment may be to refine S203 based on the method for handling image forming abnormality in one embodiment shown in FIG. 2, and add a step of transmitting the abnormal-driving information page after S204. The method for handling image forming abnormality may include the following steps.

In S301, the print job from the control terminal may be acquired.

The print job may be transmitted to the image forming apparatus on the control terminal through the control program.

In S302, the print job may be analyzed to obtain the analysis result.

In S303, when the analysis result is a failed analysis and if the analysis result includes the version number of the control program, a preset version of the control program pre-stored may be acquired.

In S304, when the version number of the control program in the analysis result is inconsistent with the preset version, it is determined that the control program is abnormal.

The preset version is a version of the control program supported by the analysis unit of the image forming apparatus, or may be the latest version or a compatible version of the control program corresponding to the analysis unit. The preset version may be one or more.

Specifically, when the version number of the control program in the analysis result is not the preset version, it is determined that the control program is abnormal.

In S305, when the analysis result is a failed analysis and if the analysis result includes the compression parameter, the decompression parameter pre-stored by the analysis unit of the image forming apparatus may be acquired.

In S306, when the decompression parameter does not correspond to the compression parameter, it is determined that the control program is abnormal.

Specifically, the decompression parameter does not correspond to the compression parameter, that is, the decompression method of the analysis unit does not correspond to the compression method of the control program, so that the analysis unit may not decompress the print job according to the decompression parameter to obtain the print content and print parameter.

Specifically, S305 and S306 may be performed first, and then S303 and S304 may be performed. Or, S303 and S305 may be executed in parallel.

In S307, the abnormal-driving information page may be generated, and the abnormal-driving information page may be outputted through printing.

In S308, the abnormal-driving information page may be transmitted to the control terminal.

Specifically, the user may access the download address of the control program in the abnormal-driving information at the control terminal, download the latest or correct version of the control program, and complete the upgrade or replacement of the control program, such that the control program of the control terminal may be matched with the analysis unit of the image forming apparatus, thereby facilitating the printing of the corresponding print content.

Specifically, S308 may be executed first and then S307 may be executed, or S307 and S308 may be executed in parallel.

In one embodiment, the print job may be analyzed by the analysis unit; when the print job cannot be successfully analyzed, the version number or compression parameter of the control program in the analysis result may be used to determine whether the version number of the control program is consistent with the preset version or determine whether the compression parameter is consistent with the decompression parameter of the analysis unit. If the version number of the control program is not consistent with the preset version or if the compression parameter is not consistent with the decompression parameter of the analysis unit, it is determined that the control program is abnormal, and the abnormal-driving information page may be generated and outputted through printing; and the abnormal-driving information page may be transmitted to the control terminal, such that the user may update the control program according to the network address in the abnormal-driving information page, which may improve the convenience of upgrading the control program, the printing abnormality handling efficiency, and the user experience. If the analysis result includes both the version number and the compression parameter of the control program, the determination result of the compression parameter may be used as the reference. For example, if the compression parameter is not consistent with the decompression parameter of the analysis unit, it is determined that the control program is abnormal, regardless of the version number.

Furthermore, the control program in one embodiment may not be limited to the control program on the computer, and may also be an application program on a mobile device (e.g., a mobile phone or tablet computer) for exchanging data with the image forming apparatus. When the version of the application program of the mobile device does not match the preset version of the analysis unit of the image forming apparatus, or the compression parameter used by the application program of the mobile device does not match the decompression parameter used by the analysis unit which result in that the image forming apparatus cannot analyze the print job issued by the application program successfully, various embodiments of the present disclosure also be applied to solve the above-mentioned problem.

The control terminal in various embodiments of the present disclosure may be a device such as a computer, a mobile phone, a tablet computer, a network server, and the like which can exchange the print job with the image forming apparatus.

Furthermore, when it is found that the control program is abnormal in various embodiments of the present disclosure, other units inside the image forming apparatus may be used to analyze the print job from the control terminal to obtain image data for printing. For the problem in the existing technology that the analysis unit 121 cannot perform the correct analysis of the print job and the image forming apparatus 120 prints to output garbled characters, in addition to prompting the user to upgrade the control program in the above-mentioned embodiments, software code which can match the abnormal control program may also be added to the image forming apparatus. When the image forming unit performs analysis on the received print job and finds that the control program is abnormal, the added software code may be used to analyze the print job, such that the image data can be obtained for printing, which may prevent that the user cannot use the printer due to not upgrading the control program on time.

Figure 6:
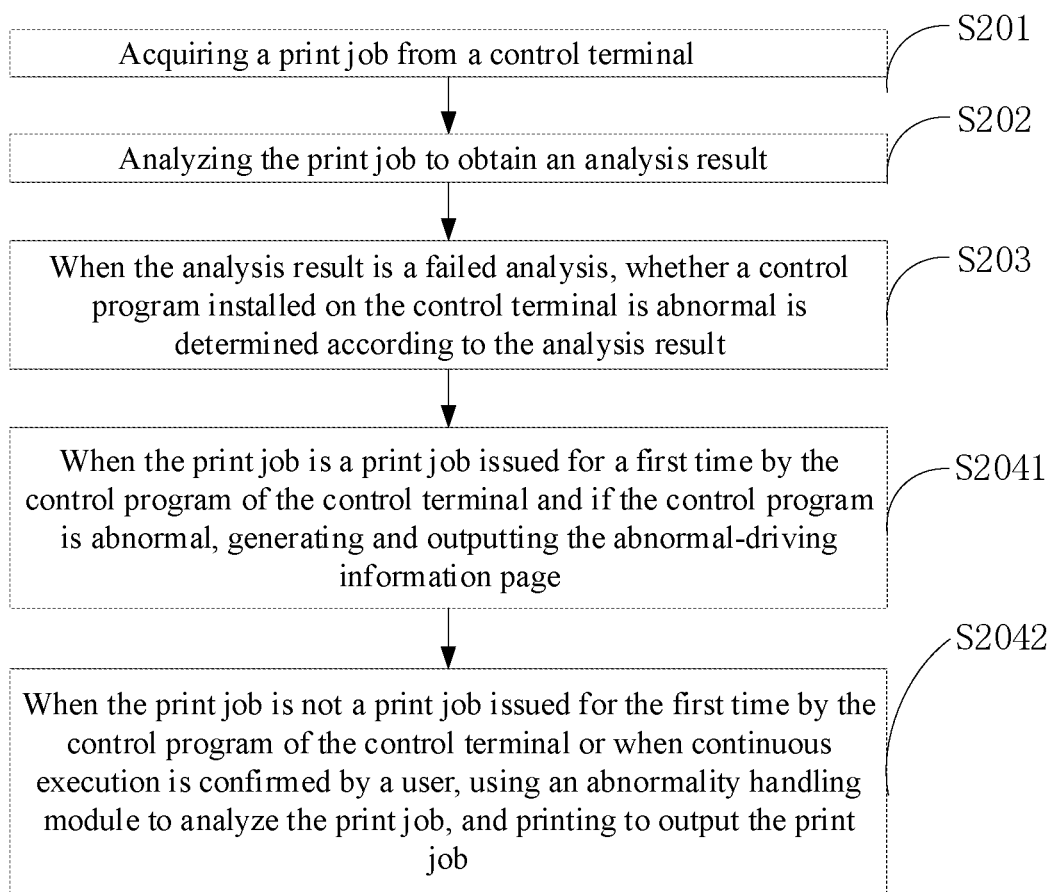
FIG. 6 illustrates another flowchart of a method for handling image forming abnormality according to various exemplary embodiments of the present disclosure.

The detailed flowchart of the control method is shown in FIG. 6, and S201-S203 are consistent with the above-mentioned depiction, which may not be described in detail.

The specific improvement of the control method may be described in S2041 and S2042.

In S2041, if the control program is abnormal and when the print job is a print job that cannot be analyzed for the first time after the image forming apparatus is turned on, the abnormal-driving information page may be generated, and the abnormal-driving information page may be outputted through printing.

If it is found that the control program is abnormal and when the print job is a print job that cannot be analyzed for the first time after the image forming apparatus is turned on, the abnormal-driving information page may need to be generated and outputted through printing, thereby prompting the user that the control program needs to be upgraded. In order to for the user to continue to execute the print job more conveniently, when the user urgently needs to print text and has not sufficient time to upgrade the control program, whether printing continues to be performed may be displayed on the control panel of the image forming apparatus or the user may re-issue the same print job, such that the image forming apparatus may continue to analyze the print job, and output the print job through printing.

In S2042, when the print job is not a print job issued for the first time by the control program of the control terminal or when continuous execution is confirmed by a user, the abnormality handling module may be used to analyze the print job, and the print job may be outputted through printing. If the control program is abnormal and when the print job is not a print job that cannot be analyzed for the first time after the image forming apparatus is turned on, or when the user confirms continuous execution of the print job, the print job may be analyzed and outputted through printing.

Specifically, if it is found that the control program is abnormal, and the print job is not the print job that cannot be analyzed for the first time after the image forming apparatus is turned on, but a subsequent print job, the print job may be analyzed and outputted through printing. In addition, while the image forming apparatus prints to output the abnormal-driving information page in S2041, the user may be prompted by the display panel that whether printing continues to be performed. When the user confirms continuous execution of the print job, the print job may be analyzed and outputted through printing. Furthermore, printing to output the print job may be performed after the user re-issues the same print job.

The output of the print job may be executed in S2042 because of the firmware improvement in the image forming apparatus. When the analysis unit 121 finds that the print job cannot be analyzed after analyzing the print job, the software code added inside the image forming apparatus may analyze the print job issued by an unmatched control program, which may ensure that the print job issued by any version of the driving program may be outputted through printing, and the image forming device may not stop printing due to the unmatched version of the control program.

Optionally, only when the print job is issued by the unmatched control program for the first time after the image forming apparatus is turned on, the abnormal-driving information page may be printed out to save paper; and after the image forming apparatus is turned on, other subsequent jobs issued by a same unmatched control program may also be outputted through printing, which may avoid the user's inconvenience that the image forming device does not print the print job issued by the abnormal control program. In addition, the user may be reminded of abnormal information when the print job is issued by the unmatched control program for the first time after the image forming apparatus is turned on, thereby preventing the user from forgetting to upgrade the control program.

Specifically, after the image forming apparatus is turned on and when the analysis unit 121 analyzes the print job and finds that the control program is abnormal for the first time, the image forming apparatus may store information such as the name, IP address, MAC address, or the like of the control terminal of the abnormal control program. When the analysis unit 121 analyzes subsequent print jobs and finds that the control program is abnormal again, the name, IP address, MAC address, or the like of the control terminal of the print job obtained again may be compared with the stored name, IP address, MAC address, or the like of the control terminal. If the names, IP addresses, MAC addresses, or the like are consistent with each other, it may indicate that previous and subsequent jobs are issued by a same unmatched control program, and the subsequent print jobs may be outputted through printing. In such way, it may avoid that the control program prints the abnormal-driving information page every time when the print job is issued which may result in paper waste, and the printing function of the image forming apparatus may not be used until the control program is upgraded.

In addition, the name, IP address, MAC address, or the like of the control terminal of the print job obtained again may be compared with the stored name, IP address, MAC address, or the like of the control terminal. If the names, IP addresses, MAC addresses or the like are consistent with each other, it indicates that the control program of the subsequent job may issue the print job for the first time and may be an unmatched version, the abnormal-driving information page may be printed out to remind the user to upgrade the control program.

Optionally, for each unmatched control program installed in the control terminal 110 to issue the print job for the first time, the image forming apparatus may need to print the abnormal-driving information page to remind the user to upgrade the control program. In order to avoid being unable to print for a long time or wasting paper, printing to output subsequent print jobs issued by the same unmatched control program may be performed.

Figure 4:
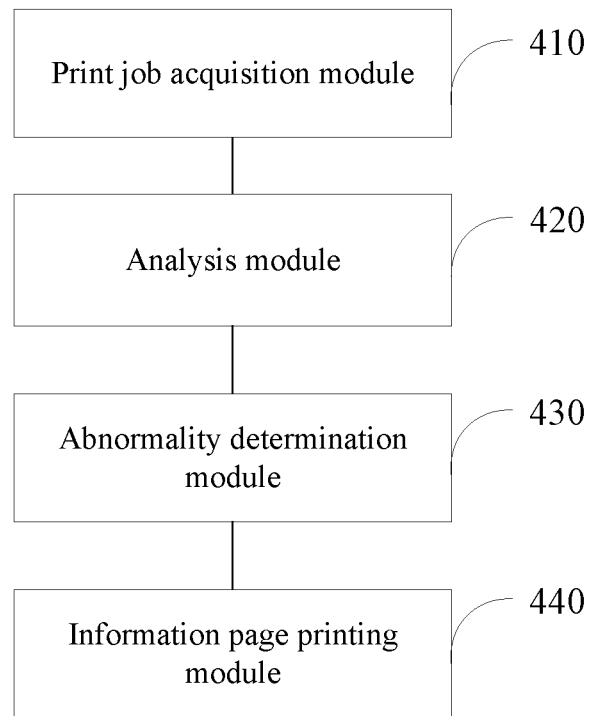
FIG. 4 illustrates a structural schematic of an apparatus for handling image forming abnormality according to various exemplary embodiments of the present disclosure.

FIG. 4 illustrates a structural schematic of an apparatus for handling image forming abnormality according to various exemplary embodiments of the present disclosure. As shown in FIG. 4, the apparatus for handling image forming abnormality provided by one embodiment may include: a print job acquisition module 410, an analysis module 420, an abnormality determination module 430, and an information page printing module 440.

The print job acquisition module 410 may be configured to acquire the print job from the control terminal. The analysis module 420 may be configured to analyze the print job to obtain the analysis result. The abnormality determination module 430 may be configured to, when the analysis result is a failed analysis, determine whether the control program installed on the control terminal is abnormal according to the analysis result, where the control program may be a program which enables the control terminal to exchange the print job with the image forming apparatus. The information page printing module 440 may be configured to, if the control program is abnormal, generate the abnormal-driving information page and print to output the abnormal-driving information page.

Optionally, the print job may include the job header information, the page information, the page compression parameter, the page compression data, and the job tail information.

Optionally, the analysis result may include the version number of and/or compression parameter the control program.

Optionally, if the analysis result includes the version number of the control program, the abnormality determination module 430 may include a preset version acquisition unit, configured to, when the analysis result is a failed analysis, acquire the preset version of the control program pre-stored; and include a first abnormality determination unit, configured to, when the version number of the control program in the analysis result is inconsistent with the preset version, determine that the control program is abnormal.

Optionally, if the analysis result includes the compression parameter, the abnormality determination module 430 may be configured to acquire the decompression parameter pre-stored by the analysis module 420; and, when the analysis result is a failed analysis and the decompression parameter does not correspond to the compression parameter, determine that the control program is abnormal.

Optionally, the abnormal-driving information page may include the preset network address for driving, such that the control program may be maintained according to the preset network address for driving.

Optionally, the print job may be transmitted from the control terminal to the apparatus for handling program abnormality through the control program, and the apparatus for handling image forming abnormality may further include an information page transmission module, configured to transmit the abnormal-driving information page to the control terminal after the abnormal-driving information page is generated.

The apparatus for handling image forming abnormality provided in various embodiments of the present disclosure may execute the method for handling image forming abnormality provided in any embodiment of the present disclosure, and may have the corresponding functional modules and beneficial effects of the method implemented by each function module.

Furthermore, the image forming apparatus may also include an abnormality handling module (not shown) in order to execute the print job issued by the control program with the print abnormality. If the abnormality determination module 430 finds that the control program is abnormal and when the print job is issued by the unmatched control program for the first time after the image forming apparatus is turned on, the abnormality handling module may not analyze the print job; instead, the information page printing module 440 may output the abnormal-driving information page to remind the user to upgrade and maintain the abnormal control program. In order to for the user to continue to execute the print job more conveniently, when the user urgently needs to print text and has not sufficient time to upgrade the control program at some cases, whether the printing continues to be performed may be displayed on the control panel of the image forming apparatus or the user re-issues the same print job, the abnormality handling module may be used to analyze the print job and print to output the print job. The abnormality handling module may execute the process flow of S2042, which may not be described in detail in one embodiment.

The abnormality handling module may be embodied as a processing unit or a software code in the image forming apparatus. The abnormality handling module may be a component of the analysis module 420, or may be independent from the analysis module 420.

Figure 5:
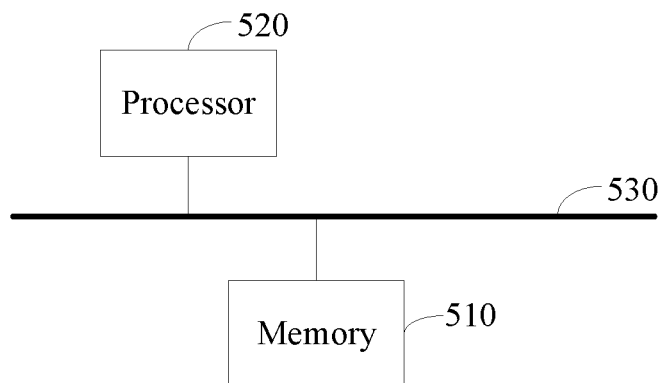
FIG. 5 illustrates a structural schematic of an image forming apparatus according to various exemplary embodiments of the present disclosure.

FIG. 5 illustrates a structural schematic of an image forming apparatus according to various exemplary embodiments of the present disclosure. As shown in FIG. 5, the image forming apparatus may include a memory 510 and at least one processor 520.

A computer program may be stored in the memory 510 and configured to be executed by the processor 520 to implement the method for handling image forming abnormality provided in any one of embodiments corresponding to FIGS. 2-3 of the present disclosure.

The memory 510 and the processor 520 may be connected to each other through a bus 530.

Specifically, the image forming apparatus may be a miniature printer, including a housing, a consumable box, and a printing mechanism, where the memory 510, the processor 520, and the like may be disposed in the housing.

Furthermore, the image forming apparatus may also include a display device for displaying the job progress, printer status, error code, and the like.

The related description may be understood by referring to the related description and effects corresponding to the steps in FIGS. 2-3, which may not be described in detail herein.

Various embodiments of the present disclosure provide a computer-readable storage medium on which a computer program is stored. The computer program may be executed by the processor to implement the method for handling image forming abnormality provided in any one of embodiments corresponding to FIGS. 2-3 of the present disclosure.

The computer-readable storage medium may be a ROM, a random access memory (RAM), a CD-ROM, a magnetic tape, a floppy disk, an optical data storage device, and the like.

In some embodiments provided in the present disclosure, it should be understood that the disclosed apparatus and method may be implemented by other manners. For example, the apparatus embodiments described above may merely be illustrative. For example, the division of modules may merely be a logical function division, and there may be other division manners in actual implementation. For example, multiple modules or components may be combined or integrated into another system, or some features may be omitted or may not be implemented. In addition, the described or discussed mutual coupling, or direct coupling, or communication connection may be indirect coupling or communication connection through some interfaces, devices, or modules, and may be electrical, mechanical, or other manners.

Those skilled in the art may easily think of other embodiment solutions of the present disclosure after considering the specification and practicing the disclosure disclosed herein. The present disclosure may be intended to cover any modifications, uses or adaptive changes of the present disclosure. These modifications, uses, or adaptive changes may follow the general principle of the present disclosure and include common knowledge or conventional technical means in the technical field which are not disclosed in the present disclosure. The description and various embodiments may merely be regarded as exemplary, and the scope and spirit of the present disclosure may be referred to the appended claims.

It should be understood that the present disclosure may not be limited to the precise structure that has been described above and shown in the drawings, and various modifications and changes may be made without departing from its scope. The scope of the present disclosure may merely be limited by the appended claims.

What is claimed is:

1. A method for handling image forming abnormality, applied to an image forming apparatus, comprising:
    acquiring a print job from a control terminal;
    analyzing the print job to obtain an analysis result;
    determining whether a control program installed on the control terminal is abnormal according to the analysis result, wherein the control program enables the control terminal to exchange the print job with the image forming apparatus;
    determining whether the print job is issued for a first time by the control program of the control terminal; and
    in response to determining the print job is issued for the first time by the control program of the control terminal, and in response to determining the control program is abnormal, generating an abnormal-driving information page, and printing to output the abnormal-driving information page.

2. The method according to claim 1, wherein the analysis result includes a version number of the control program, determining whether the control program installed on the control terminal is abnormal according to the analysis result includes comprises:
    acquiring a preset version of the control program; and
    in response to a determination that the version number of the control program in the analysis result is inconsistent with the preset version, determining that the control program is abnormal.

3. The method according to claim 1, wherein the analysis result includes a compression parameter, determining whether the control program installed on the control terminal is abnormal according to the analysis result includes comprises:
    acquiring a preset decompression parameter; and
    in response to a determination that the decompression parameter is inconsistent with the compression parameter, determining that the control program is abnormal.

4. The method according to claim 1, wherein the abnormal-driving information page includes a preset network address.

5. The method according to claim 1, further comprising:
    transmitting the abnormal-driving information page to the control terminal.

6. The method according to claim 1, further comprising:
    in response to determining the print job is not issued for the first time by the control program of the control terminal outputting the print job through printing.

7. The method according to claim 1, wherein the abnormal-driving information page is generated automatically.

8. The method according to claim 1, wherein the first time is a first time after the image forming apparatus is turned on.

9. The method according to claim 1, wherein the image forming apparatus includes a printer.

10. An image forming apparatus, comprising: a memory, for storing computer-executable instructions; and at least one processor, coupled with the memory and configured, when the computer-executable instructions being executed, to perform a method, the method including:
    acquiring a print job from a control terminal;
    analyzing the print job to obtain an analysis result;
    determining whether a control program installed on the control terminal is abnormal according to the analysis result, wherein the control program enables the control terminal to exchange the print job with the image forming apparatus;
    determining whether the print job is issued for a first time by the control program of the control terminal; and
    in response to determining the print job is issued for the first time by the control program of the control terminal, and in response to determining the control program is abnormal, generating an abnormal-driving information page, and printing to output the abnormal-driving information page.

11. The apparatus according to claim 10, wherein the analysis result includes a version number of the control program, determining whether the control program installed on the control terminal is abnormal according to the analysis result includes:
  acquiring a preset version of the control program; and
  in response to a determination that the version number of the control program in the analysis result is inconsistent with the preset version, determining that the control program is abnormal.

12. The apparatus according to claim 10, wherein the analysis result includes a compression parameter, determining whether the control program installed on the control terminal is abnormal according to the analysis result includes:
  acquiring a preset decompression parameter; and
  in response to a determination that the decompression parameter is inconsistent with the compression parameter, determining that the control program is abnormal.

13. The apparatus according to claim 10, wherein the abnormal-driving information page includes a preset network address.

14. The apparatus according to claim 10, wherein the method further includes:
  transmitting the abnormal-driving information page to the control terminal.

15. The apparatus according to claim 10, wherein the method further includes:
  in response to determining the print job is not issued for the first time by the control program of the control terminal outputting the print job through printing.

16. A non-transitory computer-readable storage medium, containing program instructions for, when being executed by a processor, performing a method, the method including:
  acquiring a print job from a control terminal;
  analyzing the print job to obtain an analysis result;
  when the analysis result is a failed analysis,
    determining whether a control program installed on the control terminal is abnormal according to the analysis result, wherein the control program enables the control terminal to exchange the print job with the image forming apparatus;
  determining whether the print job is issued for a first time by the control program of the control terminal; and
  in response to determining the print job is issued for the first time by the control program of the control terminal, and in response to determining the control program is abnormal, generating an abnormal-driving information page, and printing to output the abnormal-driving information page.

17. The storage medium according to claim 16, wherein the analysis result includes a version number of the control program, determining whether the control program installed on the control terminal is abnormal according to the analysis result includes:
  acquiring a preset version of the control program; and
  in response to a determination that the version number of the control program in the analysis result is inconsistent with the preset version, determining that the control program is abnormal.

18. The storage medium according to claim 16, wherein the analysis result includes a compression parameter, determining whether the control program installed on the control terminal is abnormal according to the analysis result includes:
  acquiring a preset decompression parameter; and
  in response to a determination that the decompression parameter is inconsistent with the compression parameter, determining that the control program is abnormal.

19. The storage medium according to claim 16, wherein the abnormal-driving information page includes a preset network address.

20. The storage medium according to claim 16, wherein the method further includes:
  in response to determining the print job is not a print job issued for the first time by the control program of the control terminal outputting the print job through printing.

* * * * *